United States Patent
Kersting

[11] 3,712,686
[45] Jan. 23, 1973

[54] CONTROL VALVE

[75] Inventor: Raymond J. Kersting, Dellwood, Mo.

[73] Assignee: Wagner Electric Corporation, Newark, N.J.

[22] Filed: Feb. 11, 1972

[21] Appl. No.: 225,521

[52] U.S. Cl. ................................................. 303/71
[51] Int. Cl. .............................................. B60t 13/22
[58] Field of Search ................................. 303/68, 71

[56] References Cited

UNITED STATES PATENTS

| | | | |
|---|---|---|---|
| 3,650,568 | 3/1972 | Poplawski | 303/68 |
| 3,533,661 | 10/1970 | Cruse | 303/68 |
| 3,519,312 | 7/1970 | Cruse | 303/71 X |
| 3,504,946 | 4/1970 | Valentine et al. | 303/68 X |
| 3,464,742 | 9/1969 | Cruse | 303/68 X |
| 3,309,149 | 3/1967 | Bueler | 303/68 UX |

*Primary Examiner*—Allen N. Knowles
*Attorney*—Joseph E. Papin

[57] ABSTRACT

A control valve for use in a brake system having dual fluid pressure sources and a spring setting pressure released brake actuator is provided with selectively operable means movable between an applying position for applying said actuator fluid pressure supplied from one of said sources and a venting position for exhausting the applied fluid pressure from said actuator to effect spring setting actuation thereof, and resiliently urged means are provided to drive said selectively operable means to its venting position when the fluid pressure of the other source acting on said resiliently urged means is less than a predetermined value, said resiliently urged means including passage means for the exhausting passage therethrough of the applied fluid pressure when said selectively operable means is in its venting position.

This invention relates generally to control valves and in particular to push-pull type control valves for use in a fluid pressure system to control a spring setting pressure released brake actuator thereof.

27 Claims, 3 Drawing Figures

CONTROL VALVE

BACKGROUND OF THE INVENTION

In the past, tripping or automatically actuated push-pull type control valves have been utilized in dual fluid pressure systems for controlling the application and exhaustion of emergency fluid pressure to and from a spring setting pressure released brake actuator to effect the desired de-energization and energization thereof; however, one of the undesirable or disadvantageous features of such past control valves was that it sensed or was automatically responsive to the same emergency fluid pressure which it delivered to the brake actuator. Other tripping or automatically actuated push-pull type control valves for controlling spring setting pressure released brake actuators have also utilized a predetermined minimum service fluid pressure to effect the tripping or automatic actuation function thereof for venting the emergency fluid pressure applied to said brake actuator to atmosphere; however, one of the undesirable or disadvantageous features of such other past control valves was the complexity of design involved in maintaining the service and emergency fluid pressures isolated and isolating the emergency fluid pressure from the exhausting flow of the applied emergency fluid pressure from the brake actuator upon occurrence of the tripping function of such other past control valves. Still another undesirable or disadvantageous feature of the past push-pull type control valves was that they were unduly large in size thereby further depleting the dash or under-the-dash space which, on the modern tractor, is at a premium. And yet other undesirable or disadvantageous features of the past push-pull type control valves involved rather complex and uneconomic manufacture.

SUMMARY OF THE INVENTION

The principle object of the present invention is to provide a dual fluid pressure system and a control valve therefor which overcomes the aforementioned undesirable or disadvantageous features of the past systems and control valves, and this, as well as other objects and advantageous features of the present invention, will become apparent from the disclosure which follows.

Briefly, the invention includes a brake system having dual fluid pressure sources and a spring setting pressure released actuator responsive to fluid pressure applied thereto less than a predetermined value for energizing a brake operatively connected therewith, means for controlling the application of fluid pressure from one of said sources to said actuator and venting the applied fluid pressure from said actuator to atmosphere, and other means responsive to fluid pressure at the other of said sources less than another predetermined value for automatically actuating said first named means to isolate said one source and vent said actuator to atmosphere including means for the venting passage therethrough of the applied fluid pressure from said actuator to atmosphere. The invention also includes a control valve having means selectively movable between positions for effecting the application through said control valve of fluid pressure supplied thereto and for venting the applied fluid pressure to atmosphere, and other means responsive to control fluid pressure less than a predetermined value for driving said selectively movable means toward its position for venting the applied fluid pressure to atmosphere including passage means for the venting flow therethrough of the applied fluid pressure to atmosphere.

RELATED PATENTS

This patent application is related to U.S. Pat. application Ser. No. 137,798 filed Apr. 27, 1971 by George W. Stearns, U.S. Pat. application Ser. No. 174,340 filed Aug. 24, 1971 by Raymond J. Kersting, and U.S. Pat. application Ser. No. 178,010 filed Sept. 7, 1971 by David R. Hardwick et al, said applications all being assigned to the common assignee of this patent application which is a patentably distinct improvement.

DESCRIPTION OF THE DRAWINGS

In the drawings which illustrate embodiments of the present invention and wherein like numerals refer to like parts wherever they occur.

DESCRIPTION OF THE PREFERRED EMBODIMENT

Figure 1:
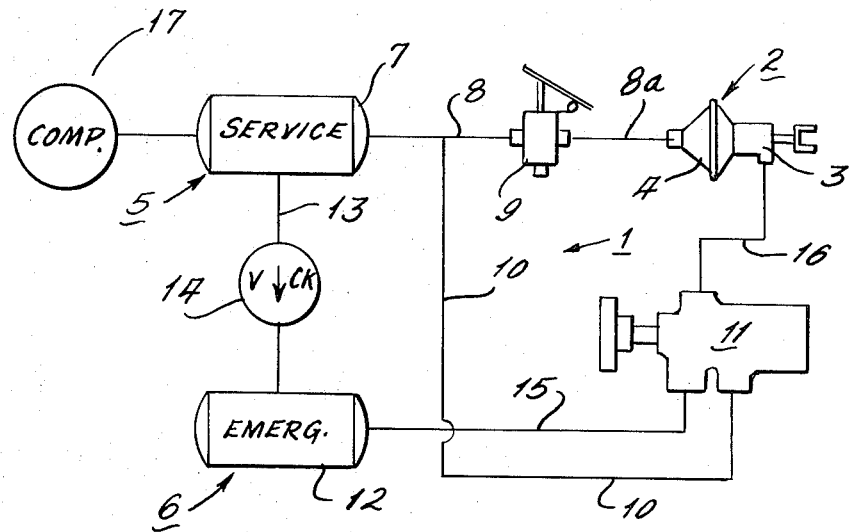
FIG. 1 is a schematic view of a fluid pressure system embodied in the present invention.

Referring now to the drawings in detail and in particular to FIG. 1, a dual fluid pressure or brake system 1 is shown for use on a vehicle having at least one spring setting fluid pressure released brake cylinder or actuator 2 of a type well known in the art and including an emergency or spring set portion 3 and a service or fluid pressure responsive or motor portion 4 for controlling the energization of a vehicle brake (not shown) operatively connected therewith. The system 1 is provided with service and emergency branches, indicated generally at 5, 6, and said service branch includes a service fluid pressure source or reservoir 7 connected with the fluid pressure responsive motor 4 of the brake actuator 2 by conduits 8, 8a having the inlet and outlet sides of an operator actuated foot or application valve 9 of a type well known in the art serially connected therebetween, and another conduit 10 is connected between the conduit 8 and one of the inlet ports of a push-pull type control valve 11. The emergency branch 6 includes an emergency fluid pressure source or protected reservoir 12 which is connected with the service reservoir 7 by a conduit 13 having a uni-directional flow or check valve 14 interposed therein, and another conduit 15 is connected between said emergency reservoir and the other inlet port of the control valve 11. To complete the description of the system 1, another conduit 16 is connected between the outlet or delivery port of the control valve 11 and the spring set portion 3 of the brake actuator 2, and a compressor 17 is connected with the service reservoir by a conduit 18.

Figure 2:
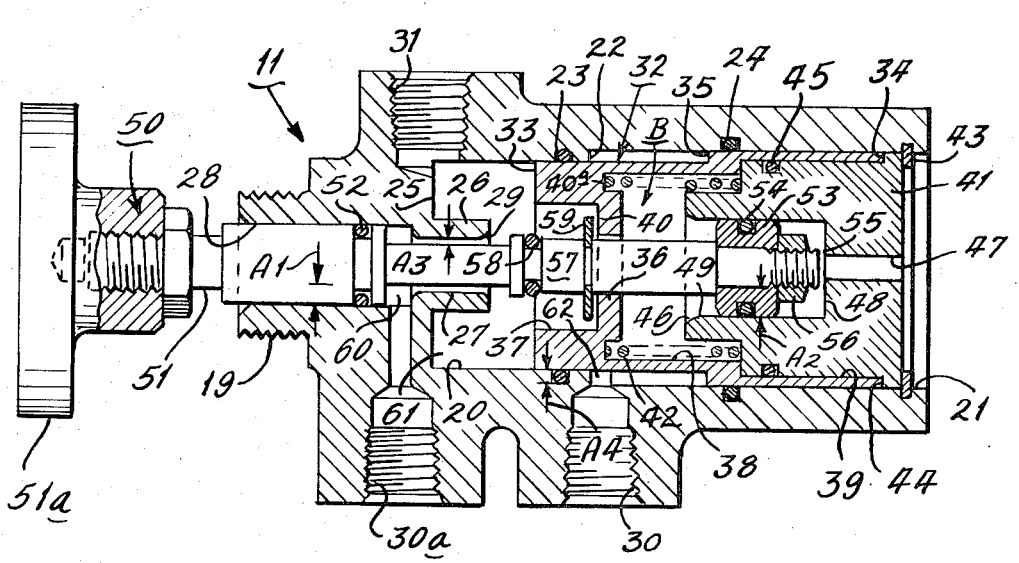
FIG. 2 is a sectional view illustrating the control valve of FIG. 1 which is also embodied in the present invention in cross-section.

Referring now to FIG. 2, the control valve 11 is provided with a housing 19 having a bore and counterbore 20, 21 therein, and an annular shoulder or abutment 22 is defined on said housing between said bore and counterbore. A sealing member or O-ring seal 23 is carried in the bore 20 adjacent to the shoulder 22, and another sealing member or O-ring seal 24 is carried in the counterbore 21 adjacent to the mid-portion thereof. The bore 20 is provided with an end wall 25, and an annular hub 26 is integrally formed on the housing 19 extending coaxially from said end wall into said bore. Another bore 27 is axially provided in the hub 26 having one end connected in pressure fluid communication with the bore 20 and the other end thereof intersecting with another counterbore 28 axially provided in the housing 19, and the side wall of the hub bore 27 defines a valve seat 29. A pair of inlet or service and emergency ports 30, 30a which receive conduits 10, 15, as previously mentioned, are provided in the housing 19 intersecting with counterbores 20, 28, respectively, and an outlet or delivery port 31 which receives conduit 16, as previously mentioned, is also provided in said housing intersecting with the bore 20 adjacent to the end wall 25 thereof.

An automatic actuating or resiliently urged means, such as the stepped control piston 32 is provided with opposed end portions 33, 34 and slidably received in the housing bore and counterbore 20, 21 in sealing engagement with the seals 23, 24, respectively, and a radially extending shoulder or abutment 35 is provided on said control piston between said opposed end portions thereof. The control piston leftward end 33 defines an abutment for engagement with the housing end wall 25 to limit leftward movement of said control piston, as discussed hereinafter. The control piston 32 is provided with a venting or exhausting passage means B therethrough defined by a bore 36 interposed between a counterbore 37 which intersects with the control piston end portion 33 and stepped counterbores 38, 39 which intersect with the control piston end portion 34. An annular shoulder or abutment 40 is provided on said control piston 32 between the bore 36 and counterbore 37, and a counter-sunk spring receiving shoulder 40a is also provided on said control piston between the smaller stepped counterbore 38 and said bore.

A stepped closure member or end plug 41 is slidably received in the larger stepped counterbore 39 of the control piston 32 and the housing counterbore 21 closing the open or rightward end thereof, and a control piston spring 42 is interposed between the control piston shoulder 40a and the interior end of said closure member urging said closure member into displacement preventing engagement with a snap ring and groove assembly 43 provided adjacent to the rightward end of the housing counterbore 21. An annular, radially extending shoulder or abutment 44 is provided on the closure member 41 between the peripheral stepped portions thereof for engagement with the control piston end portion 34 to limit the rightward movement of the control piston 32, as discussed hereinafter, and a sealing member or O-ring seal 45 is carried on the peripheral portion of said closure member adjacent to the interior end thereof in sealing engagement with the larger stepped counterbore 39 of the control piston 32. The closure member 41 is also provided with stepped exhaust passage and port 46, 47 extending coaxially therethrough, and an annular shoulder or abutment 48 is provided on said closure member between said stepped exhaust passage and port, said exhaust passage 46 having a side wall defining an exhaust valve seat 49.

A selectively operable valve or application member, such as the push-pull or actuating rod indicated generally at 50, is provided with an exteriorly extending end or operator applied force receiving portion 51, to which is connected a knob 51a, and said rod is slidably received in the housing counterbore 28 carrying a peripheral seal 52 in sealing engagement therewith. A radially extending flange or exhaust valve member, such as the piston 53, is slidably received in the larger stepped exhaust passage 46 of the closure member 41 carrying a peripheral seal or exhaust valve 54 for sealing engagement with the closure member exhaust valve seat 49 to interrupt pressure fluid communication between the exhaust port 47 and the inlet and outlet ports 30, 31, respectively, and said flange is retained on the interior or free end portion 55 of the push rod 50 against displacement by a nut 56 threadedly received thereon, said push rod free end being engagable with the closure member shoulder 48 to define the "in" position of said push rod, as shown. The push rod 50 is also provided with a reduced intermediate portion 57 integrally formed between the push rod exterior and interior ends 51, 55, and said intermediate portion extends coaxially through the housing hub bore 27 and the exhaust passage B of the control piston 32. A sealing member or O-ring 58 is carried on the push rod intermediate portion 57 adjacent to the mid-portion thereof and defines a valve for sealing engagement with the hub valve seat 29, and a snap ring or abutment 59 is also carried on said push rod intermediate portion rightwardly of the valve member 58 for abutting engagement with the control piston shoulder 40.

An inlet chamber 60 is provided in the hub ore and counterbore 27, 28 between the sealing engagement of the push rod seal 52 with said counterbore and the sealing engagement of the push rod valve member 58 with the hub valve seat 29, and said inlet chamber is connected in pressure fluid communication with the inlet port 30a at all times. An outlet chamber 61 is defined in the housing bore 20 and control piston passage B between the housing end wall 25 and the interior end of the closure member 41, said outlet chamber being in open pressure fluid communication with the outlet port 31 at all times and being selectively connected in pressure fluid communication with said inlet chamber and the exhaust port 47, as discussed hereinafter. An expansible control chamber 62 is defined in the housing 19 between the housing counterbore 21 and the periphery of the control piston 32 and between the housing and control piston shoulders 22, 35, said control chamber being in open pressure fluid communication with the control port 30 at all times.

The push rod 50 is provided with opposed annular cross-sectional effective areas $A_1$, $A_2$ defined between the peripheral of the smaller reduced portion of the push rod intermediate member 57 and the sealing engagement of the push rod seals 52 and 55 with the housing counterbore 28 and closure member exhaust valve seat 49, respectively, and the area $A_2$ is predeterminately greater in size than the area $A_1$. The area $A_1$ is subjected to the fluid pressure at the inlet port 30a at all times, and the area $A_2$ is subjected to the fluid pressure at the outlet port 31 at all times. Another annular, cross-sectional effective area $A_3$ is also provided on the push rod 50 defined between the periphery of the smaller reduced portion of the push rod intermediate member 57 and the sealing engagement of the push rod valve member 58 with the hub valve seat 29, and the area $A_3$ is opposed to and predeterminately less than the area $A_1$. Of course, the area $A_3$ is only effective when the push rod 50 is in its "out" position with the valve member 58 engaged with the hub valve seat, as described hereinafter, and at that time, said area $A_3$ is subjected to the fluid pressure at the inlet port 30a. To complete the description of the control valve 11, an annular, effective, cross-sectional control area $A_4$ is defined on the control piston 32 by the shoulder 35 in the control chamber 62 which is subjected to the fluid pressure at the control port 30 at all times.

OPERATION

With the component parts of the control valve 11 in their "in" positions as shown in FIG. 2, fluid pressure generated by the compressor 17 flows through the conduit 18 to the service reservoir 7 and therefrom through the conduit 13 and check valve 14 to the emergency reservoir 12. The service fluid pressure flows from the service reservoir 7 through the conduits 8, 19 to the control port 30 of the control valve 11 to establish a control fluid pressure in the control chamber 62 which acts on the effective area $A_4$ to establish a control force Fc, and when the magnitude of the control fluid pressure is in excess of a predetermined value, e.g. in the range of 20 to 45 psi, the control force Fc overcomes the opposing compressive force of the spring 42 to urge the control piston 32 rightwardly toward its inoperative or "in" position engaging the rightward end 34 thereof with the closure member shoulder 44. With the control piston 32 in its inoperative position, the emergency or supplied fluid pressure flows from the emergency reservoir 12 through the conduit 15, the inlet port 30a of the control valve 11 and the inlet and outlet chambers 60, 61 to establish an output or applied fluid pressure at the outlet port 31, and the applied fluid pressure thereafter flows through the conduit 16 to the spring setting portion 3 of the brake actuator 2. When the magnitude of the applied fluid pressure is in excess of another predetermined value, e.g. in the range of 90 to 120 psi, said brake actuator is de-actuated and the brake (not shown) operatively connected therewith is de-energized. It should be noted that the applied fluid pressure at the outlet port 31 acts on the effective area $A_2$–$A_1$ of the push rod 50 to establish a holding force Fr urging said push rod rightwardly to maintain said push rod in its "in" position.

In the event of the failure of the service fluid pressure due to compressor malfunction or a leak or the like in the system service branch 5 wherein the magnitude of the service or control fluid pressure in the control chamber 63 of the control valve 11 is reduced to the predetermined value, i.e. in the range of 20 to 45 psi, the control force Fc is correspondingly reduced in value, and the compressive force of the control piston spring 42 is effective to automatically move the control piston 32 leftwardly to drivingly engage the control piston shoulder 40 with the push rod abutment 59. Upon the engagement of the control piston shoulder 40 and push rod abutment 59 the control piston and push rod 32, 50 are thereafter concertedly movable by the control spring 42 to their respective operative "out" or venting positions. During the initial movement of the push rod 50 toward its "out" position, the rod valve member 58 is moved leftwardly therewith into sealing engagement with hub bore valve seat 29 interrupting pressure fluid communication between the inlet and outlet chambers 60, 61 and isolating the supplied fluid pressure at the inlet port 30a from the applied fluid pressure at the outlet port 31, and upon further leftward movement of said push rod, the rod valve member 54 is disengaged from the closure member exhaust valve seat 49 to thereby open the closure member exhaust passage 46 and establish pressure fluid communication therethrough between the outlet port 31 and the exhaust port 47. In this manner, the applied fluid pressure is exhausted to atmosphere from the spring set portion 3 of the brake actuator 2 through the conduit 16, the outlet port 31, the outlet chamber 61, the control piston passage B, and the closure member exhaust passage and port 46, 47. After the disengagement of the rod valve member 54 from the exhaust valve seat 49, the leftward movement of the control piston 32 engages the end 33 thereof with the housing end wall 25 which defines the "out" positions of said control piston and push rod 50. Upon such exhaustion of the applied fluid pressure, the spring setting portion 3 of the brake actuator 2 is actuated to effect a spring set energization of the brake connected therewith. Upon the movement of the push rod 50 toward its "out" position, the holding force Fr is, of course, eliminated upon the exhaustion of the applied fluid pressure to the atmosphere, and with the control piston and rod 32, 50 in their respective operative or "out" positions, the supplied fluid pressure at the inlet port 30a acts on the effective area $A_1$–$A_3$ of the rod 50 to establish a leftwardly directed holding force Fl additive to the force of the control spring 42 to maintain said rod in its "out" position.

Of course, it is readily apparent that the rod 50 can be selectively and independently manually moved to its "out" position in response to an operator force selectively applied to the knob 51a, and such selective manual movement of said rod is relative to the control piston 32 in its inoperative or "in" position when the control fluid pressure in the control chamber 63 acting on the control area $A_4$ is in excess of the predetermined value in the range of 20 to 45 psi. As the rod 50 is selectively manually moved to its "out" position, the sealing engagement of the rod valve member 58 with the hub bore valve seat 29 is effective to close the hub bore 27 and isolate the supplied fluid pressure at the inlet port 30a from the applied fluid pressure at the outlet port 31, and the disengagement of the rod valve member 54 from the closure member valve seat 46 effects the exhaustion of the applied fluid pressure and the actuation of the spring setting portion of the brake actuator 2 in the same manner as previously described.

With the control piston and push rod 32, 50 urged to their respective operative or "out" positions by the compressive force of the spring 40, as described hereinbefore, the operator can, if desired, override the automatic actuation of the control valve 11 by said control piston and spring. The override is accomplished by applying and maintaining a manual force on the knob 51a to manually move the push rod 50 rightwardly toward its "in" position against the compressive force of the control piston spring 42, and the holding force F*l* which is, of course, eliminated upon the disengagement of the rod valve element 58 from the hub bore valve seat 29. Thereafter, further manual overriding rightward movement of the rod 50 re-engages the rod exhaust valve member 54 with the closure member exhaust valve seat 49 to close the exhaust passage 46 isolating the outlet port 31 from the exhaust port 47, and the rod free end 55 is drivingly engaged with the closure member shoulder 48 which defines the rightward or "in" position of said push rod. With the push rod valve member 58 disengaged from the hub bore valve seat 29, the supplied or emergency fluid pressure again flows from the inlet port and chamber 30a, 60 through the outlet chamber 61 to re-establish the applied fluid pressure at the outlet port 31, the re-established applied fluid pressure flows through the conduit 16 to the spring set portion 3 of the brake actuator 2 to effect de-actuation thereof and the de-energization of the brake connected therewith.

It is, of course, desirable to override the automatic actuation of the control valve 11 and de-energize the brake to permit movement of the vehicle to a safe or off-the-road parking position until the service branch 5 can be repaired and the system 1 is again operable. When the vehicle has been moved to a desirable location for repair of the system 1, the manually applied or overriding force is removed from the push rod 50 wherein the compressive force of the control spring 42 is again operable to effect the concerted movement of the control piston and push rod 50 to their respective "out" positions, as described hereinbefore. Of course, it is again apparent that when the control piston 32 is urged to its inoperative position in response to the control force Fc acting thereon, as previously mentioned, the push rod 50 is selectively movable between its "out" and "in" positions independently of and relative to said control piston.

Figure 3:
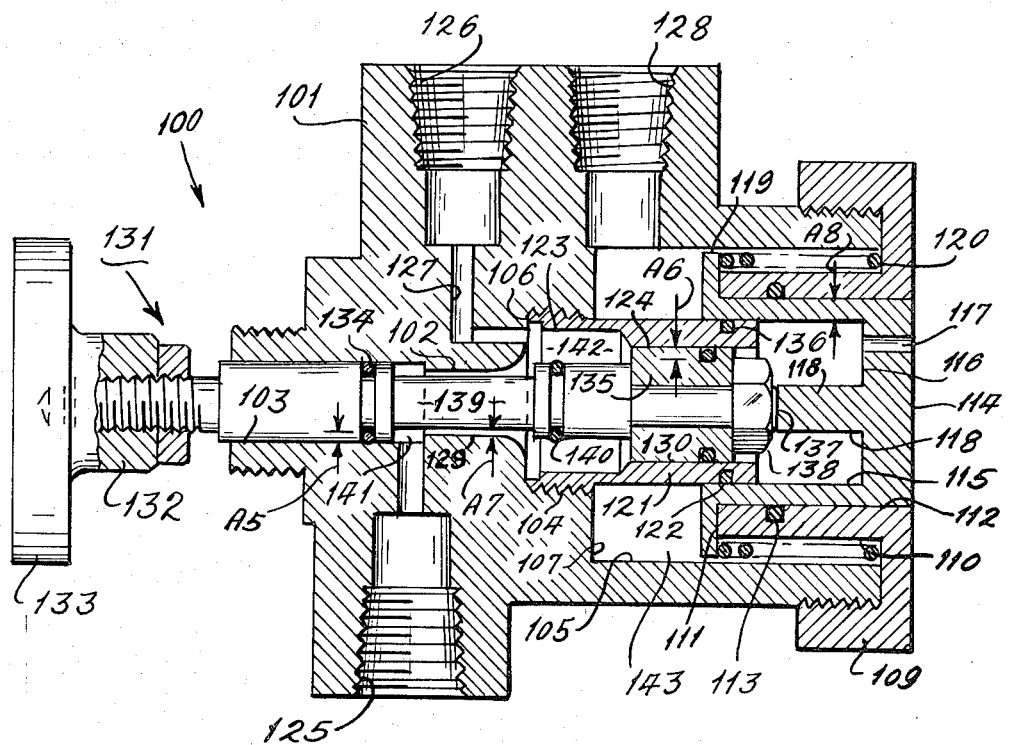
FIG. 3 is modification of the control valve shown in FIG. 2.

Referring now to FIG. 3, another control valve 100 is provided functioning in substantially the same manner in the system 1 and having substantially the same component parts as the previously described control valve 11 with the following exceptions.

The control valve 100 is provided with a housing 101 having a bore 102 therein axially interposed between a counterbore 103 and stepped counterbores 104, 105, and annular shoulders 106, 107 are provided on said housing between said bore and the smaller stepped counterbore 106 and between said stepped counterbores, respectively. A closure member 109 is threadedly received on the housing 101 adjacent to the rightward or open end of the larger stepped counterbore 105, and a hub portion 110 is integrally provided on said closure member extending coaxially into said larger stepped counterbore. An interior end or abutment 111 is provided on the closure member hub portion 110 within the larger stepped counterbore 105, and a bore 112 is axially provided through said hub portion intersecting with said interior end, said bore carrying a seal or O-ring 113 therein.

A control piston 114 is slidably received in the hub bore 112 in sealing engagement with the seal 113, and a blind bore 115 is provided through the interior end of said control piston defining an end wall 116 thereon. An exhaust port 117 is provided through the end wall 116, and an extension or abutment means 118 is integrally connected with said end wall extending coaxially into the blind bore 115. Annular radially extending flange means 119 is integrally provided on the interior end of the control piston 114 for engagement with the interior end 111 of the closure member hub portion 110, and a spring 120 is biased between the closure member 109 and said control piston flange means normally urging said flange means toward abutting engagement with the housing shoulder 107.

A sleeve member 121 extends coaxially with the larger stepped counterbore 105 having one end threadedly received in the smaller stepped counterbore 104 and the other end thereof slidably received in the control piston blind bore 115, and a peripheral seal 122 is carried in said sleeve member adjacent the other end thereof in sealing engagement with said control piston blind bore. A pair of stepped bores 123, 124 are axially provided through the sleeve member 121 connecting between the housing bore 102 and the control piston blind bore 115.

An inlet port 125 which receives the conduit 15, as previously mentioned, is provided in the housing 101 intersecting with the counterbore 103, and an outlet port 126 which receives the conduit 16, as previously mentioned, is also provided in said housing. A housing passage 127 has one end connecting with the outlet port 126 and the other end thereof intersecting with the housing shoulder 106 and connecting with the sleeve member stepped bore 123. A control port 128 which receives the conduit 10, as previously mentioned, is provided in the housing 101 intersecting with the larger stepped counterbore 105 adjacent to the shoulder 107. The side wall portions of the housing bore 102 and sleeve member smaller stepped bore 124 define valve seats 129, 130 between the inlet and outlet ports 125, 126 and between the outlet and exhaust ports 126, 117, respectively.

A selectively operable valve or application member, such as the push-pull or actuating rod indicated generally at 137, is provided with an exteriorly extending end or operator applied force receiving portion 132 to which is connected a knob 133, and said rod is slidably received in the housing counterbore 103 carrying a peripheral seal 134 in sealing engagement therewith. A radially extending flange or exhaust valve member, such as the piston 135, is slidably received in the sleeve member smaller stepped bore 124 carrying a peripheral seal or exhaust valve member 136 for sealing engagement with the sleeve member exhaust valve seat 130 to interrupt pressure fluid communication between the exhaust port 117 and the inlet and outlet ports 125, 126, respectively, and said piston is retained on the interior or free end portion 137 of the push rod 131 against displacement by a nut 138 threadedly received thereon, said push rod free end portion 137 being engagable with the control piston abutment 118 to define the "in" position of said push rod, as shown. The push rod 131 is also provided with a reduced intermediate portion 139 integrally formed between the push rod exterior and interior ends 132, 137, and said intermediate portion extends coaxially through the housing bore 102 and the sleeve member larger stepped bore 123. A seal or O-ring 140 is carried on the push rod intermediate portion 139 adjacent to the mid-portion thereof, and said seal 140 defines a valve member for sealing engagement with the housing valve seat 129.

An inlet chamber 141 is provided in the hub bore and counterbore 102, 103 between the sealing engagement of the push rod seal 134 with said counterbore and the sealing engagement of the push rod valve member 140 with the valve seat 129, and said inlet chamber is connected in pressure fluid communication with the inlet port 125 at all times. An outlet chamber 142 is defined in the sleeve member larger stepped bore 123 between the sealing engagement of the push rod valve members 140, 136 with the valve seats 129, 130, and said outlet chamber is connected in pressure fluid communication with the outlet port 126 through the connecting passage 127 at all times. An expansible control chamber 143 is defined in the housing 101 between the counterbore 105 and the sleeve member 121 and between the housing shoulder 107 and the closure member and control piston 109, 114, and said control chamber is connected in pressure fluid communication with the control port 121 at all times.

The push rod 131 is provided with opposed annular cross-sectional effective areas $A_5$, $A_6$ defined between the periphery of the push rod intermediate member 139 and the sealing engagement of the push rod seals 134, 136 with the housing counterbore 103 and the sleeve member smaller stepped bore 124, respectively, and the area $A_6$ is predeterminately greater in size than the area $A_5$. The area $A_5$ is subjected to fluid pressure at the inlet port 125 at all times, and the area $A_6$ is subjected to the fluid pressure at the outlet port 126 at all times. Another annular cross-sectional effective area $A_7$ is also provided on the push rod 131 being defined between the periphery of the intermediate portion 139 thereof and the sealing engagement of the push rod valve member 140 with the housing valve seat 129, and the area $A_7$ is opposed to and predeterminately less than the area $A_5$. Of course, the area $A_7$ is only effective when the push rod 131 is in its "out" position with the valve member 140 engaged with the housing valve seat 129, as described hereinafter, and at that time, said area $A_7$ is subjected to the fluid pressure at the inlet port 125. To complete the description of the control valve 100, an annular effective cross-sectional control area $A_8$ is defined on the control piston 114 and subjected to the control fluid pressure at the control port 131 and in the control chamber 143 at all times.

With the component parts of the control valve 100 in their "in" positions as shown in FIG. 2, fluid pressure generated by the compressor 17 flows through the conduit 18 to the service reservoir 7 and therefrom through the conduit 13 and check valve 14 to the emergency reservoir 12. The service fluid pressure flows from the service reservoir 7 through the conduits 8, 19 to the control port 121 of the control valve 100 to establish a control fluid pressure in the control chamber 143 which acts on the effective area $A_8$ to establish the control force Fc, and when the magnitude of the control fluid pressure is in excess of a predetermined value, e.g. in the range of 20 to 45 psi, the control force Fc overcomes the opposing compressive force of the spring 120 to urge the control piston 114 rightwardly toward its inoperative or "in" position engaging the flange 119 thereof with the closure member abutment 111. With the control piston 114 in its inoperative position, the emergency or supplied fluid pressure flows from the emergency reservoir 12 through the conduit 15, the inlet port 125 of the control valve 100 and the inlet and outlet chambers 141, 142 to establish an output or applied fluid pressure at the outlet port 126, and the applied fluid pressure thereafter flows through the conduit 16 to the spring setting portion 3 of the brake actuator 2. When the magnitude of the applied fluid pressure is in excess of another predetermined value, e.g. in the range of 90 to 120 psi, said brake actuator is de-actuated and the brake (not shown) operatively connected therewith is de-energized. It should be noted that the applied fluid pressure at the outlet port 126 acts on the effective area $A_6-A_5$ of the push rod 131 to establish the holding force Fr urging said push rod rightwardly to maintain said push rod in its "in" position.

In the event of the failure of the service fluid pressure due to compressor malfunction or a leak or the like in the system service branch 5 wherein the magnitude of the service or control fluid pressure in the control chamber 143 of the control valve 100 is reduced to the predetermined value, i.e. in the range of 20 to 45 psi, the control force Fc is correspondingly reduced in value, and the compressive force of the control piston spring 120 is effective to automatically move the control piston 114 leftwardly to drivingly engage the control piston abutment 118 with the push rod free end 137. Upon the engagement of the control piston abutment 118 and push rod free end 137, the control piston and push rod 114, 131 are thereafter concertedly movable by the control spring 120 to their respective operative "out" or venting positions. During the initial movement of the push rod 131 toward its "out" position, the rod valve member 140 is moved leftwardly therewith into sealing engagement with the housing valve seat 129 interrupting pressure fluid communication between the inlet and outlet chambers 141, 142 and isolating the supplied fluid pressure at the inlet port 125 from the applied fluid pressure at the outlet port 126, and upon further leftward movement of said push rod, the rod valve member 136 is disengaged from the sleeve member exhaust valve seat 130 to thereby open the sleeve member exhaust passage or smaller stepped bore 124 and establish pressure fluid communication therethrough between the outlet port 126 and the exhaust port 117 in the control piston 114. In this manner, the applied fluid pressure is exhausted to atmosphere from the spring set portion 3 of the brake actuator 2 through the conduit 16, the outlet port 126, the outlet chamber 142, the sleeve member smaller stepped bore 124, and the control piston bore and exhaust port 112, 117. After the disengagement of the rod valve member 136 from the exhaust valve seat 130, the leftward movement of the control piston 114 engages the flange 119 thereof with the housing shoulder 107 which defines the "out" positions of said control piston and push rod 131. Upon such exhaustion of the applied fluid pressure, the spring setting portion 3 of the brake actuator 2 is actuated to effect a spring set energization of the brake connected therewith. Upon the movement of the push rod 131 toward its "out" position, the holding force Fr is, of course, eliminated upon the exhaustion of the applied fluid pressure to the atmosphere, and with the control piston and rod 114, 131 in their respective operative or "out" positions, the supplied fluid pressure at the inlet port 30a acts on the effective area $A_5$–$A_7$ of the rod 50 to establish a leftwardly directed holding force F additive to the force of the control spring 42 to maintain said rod in its "out" position.

Of course, it is readily apparent that the rod 131 can be selectively and independently manually moved to its "out" position in response to an operator force selectively applied to the knob 133, and such selective manual movement of said rod is relative to the control piston 114 in its inoperative or "in" position when the control fluid pressure in the control chamber 143 acting on the control area $A_8$ is in excess of the predetermined value in the range of 20 to 45 psi. As the rod 131 is selectively manually moved to its "out" position, the sealing engagement of the rod valve member 140 with the housing valve seat 129 is effective to close the housing bore 102 and isolate the supplied fluid pressure at the inlet port 125 from the applied fluid pressure at the outlet port 126, and the disengagement of the rod valve member 136 from the sleeve member valve seat 130 effects the exhaustion of the applied fluid pressure and the actuation of the spring setting portion of the brake actuator 2 in the same manner as previously described.

With the control piston and push rod 114, 131 urged to their respective operative or "out" positions by the compressive force of the spring 120, as described hereinbefore, the operator can, if desired, override the automatic actuation of the control valve 100 by said control piston and spring. The override is accomplished by applying and maintaining a manual force on the knob 133 to manually move the push rod 131 rightwardly toward its "in" position against the compressive force of the control piston spring 120, and the holding force F which is, of course, eliminated upon the disengagement of the rod valve element 140 from the housing valve seat 129. Thereafter, further manual overriding rightward movement of the rod 131 re-engages the rod exhaust valve member 136 with the sleeve member exhaust valve seat 130 to close the exhaust passage 112, 124 isolating the outlet port 126 from the exhaust port 117, and the rod free end 137 is drivingly engaged with the control piston abutment 118 which defines the rightward or "in" position of said push rod. With the push rod valve member 140 disengaged from the housing valve seat 129, the supplied or emergency fluid pressure again flows from the inlet port and chamber 125, 141 through the outlet chamber 142 to re-establish the applied fluid pressure at the outlet port 126, and the re-established applied fluid pressure flows through the conduit 16 to the spring set portion 3 of the brake actuator 2 to effect de-actuation thereof and the de-energization of the brake connected therewith.

It is, of course, desirable to override the automatic actuation of the control valve 100 and de-energize the brake to permit movement of the vehicle to a safe or off-the-road parking position until the service branch 5 can be repaired and the system 1 is again operable. When the vehicle has been moved to a desirable location for repair of the system 1, the manually applied or overriding force is removed from the push rod 131 wherein the compressive force of the control spring 120 is again operable to effect the concerted movement of the control piston and push rod 114, 131 to their respective "out" positions, as described hereinbefore. Of course, it is again apparent that when the control piston 114 is urged to its inoperative position in response to the control force Fc acting thereon, as previously mentioned, the push rod 131 is selectively movable between its "out" and "in" positions independently of and relative to said control piston.

From the foregoing, it is now apparent that a novel system 1 and control valves 11, 100 therefor meeting the objects and advantages set out hereinbefore, as well as others, are provided and that changes as to the precise configurations, shapes and details set forth in the disclosure by way of illustration may be made by those skilled in the art without departing from the spirit of the invention.

The embodiments of the invention in which an exclusive property or privilege is claimed are defined as follows:

1. A control valve comprising a housing, application means selectively movable in said housing between one position effecting the application through said housing of fluid pressure supplied thereto and another position isolating the supplied and applied fluid pressures and venting the applied fluid pressure to atmosphere, and other means subjected to a control fluid pressure and movable in said housing for driving and driven engagement with said application means in its one and other positions, respectively, said other means being responsive to control fluid pressure less than a predetermined value acting thereon to drive said application means from its one position toward the other position thereof, and passage means in said other means for the venting passage therethrough of the applied fluid pressure to atmosphere when said application means is in its other position.

2. A control valve according to claim 1, comprising a pair of opposed abutment means on said application means and other means, respectively, said abutment means being engaged upon the driving and driven engagement of said application means and other means.

3. A control valve according to claim 1, wherein said application means extends coaxially through said passage means.

4. A control valve according to claim 1, wherein said application means extends coaxially through said passage means, a pair of opposed abutment means on said application means and on said other means about said passage means, respectively, one of said abutment means being engaged with the other thereof upon the driving and driven engagement of said application means and other means.

5. A control valve according to claim 1, wherein said other means includes resiliently urged means, said resiliently urged means being urged toward an inoperative position in said housing in response to the control fluid pressure in excess of the predetermined value acting thereon and said resiliently urged means being movable toward an operative position in said housing in response to its own force to drive said application means toward its other position when the control fluid pressure acting on said resiliently urged means is less than the predetermined value.

6. A control valve according to claim 5, wherein said application means extends coaxially through said passage means in said resiliently urged means, and abutment means on said resiliently urged means within said passage means for driving engagement with said application when the control fluid pressure acting on said resiliently urged means is less than the predetermined value.

7. A control valve according to claim 5, comprising an effective area on said resiliently urged means subjected to the control fluid pressure, said resiliently urged means being urged against its own force toward its inoperative position in said housing in response to the control fluid pressure in excess of the predetermined value acting on said area, and said resiliently urged means being movable in response to its own force toward its operative position and driving said application means therewith to its other position when the control fluid pressure acting on said area is less than the predetermined value.

8. A control valve according to claim 7, comprising opposed abutment means in said housing for engagement with said resiliently urged means and defining the operative and inoperative positions thereof, respectively.

9. A control valve according to claim 5, wherein said resiliently urged means includes piston means movable in said housing, said passage means extending axially through said piston means, abutment means on said piston means for driving and driven engagement with said application means, spring means engaged with said piston means and urging said abutment means toward engagement with said application means, said piston means defining with said housing an expansible control chamber subjected to the control fluid pressure, an effective area on said piston means within said control chamber, said piston means being movable against said spring means toward its inoperative position in said housing in response to the control fluid pressure in said control chamber in excess of the predetermined value acting on said area and said piston means being movable toward its operative position in response to the compressive force of said spring means to effect the driving engagement of said abutment means with said application means in its one position and concertedly drive said application means to its other position when the control fluid pressure in said control chamber acting on said area is less than the predetermined value.

10. A control valve according to claim 9, comprising opposed end portions on said piston means, said passage means intersecting with said opposed end portions, and opposed abutments in said housing for engagement with said opposed end portions and defining the operative and inoperative positions of said piston means in said housing, respectively.

11. A control valve according to claim 9, comprising opposed end portions on said piston means, said passage means including a bore in said piston means between said opposed end portions, said application means extending coaxially through said bore, and said abutment means being within said bore.

12. A control valve according to claim 1, wherein said application means includes a rod member extending coaxially through said passage means, and a pair of valve means on said rod member and concertedly movable therewith between the one and other positions for controlling pressure fluid communication between the supplied and applied fluid pressures and atmosphere, one of said valve means establishing pressure fluid communication between the supplied and applied fluid pressures and the other of said valve means interrupting pressure fluid communication between the applied fluid pressure and atmosphere in the one position of said rod member, and said one valve means isolating the supplied and applied fluid pressures and said other valve means establishing pressure fluid communication between the applied fluid pressure and atmosphere in the other position of said rod member.

13. A control valve according to claim 12, comprising a pair of valve seats in said housing for engagement with said valve means, respectively, said other means being movable in said housing between said valve seats, one of said one and other valve means being engaged with one of said valve seats and the other of said one and other valve means being engaged with the other of said valve seats when said rod member is in its one and other positions, respectively.

14. A control valve according to claim 1, comprising a pair of opposed effective areas on said application means, one of said holding areas being predeterminately greater than the other thereof, said areas being subjected to the supplied and applied fluid pressure to establish a holding force urging said application means toward its one position when said holding means is in its one position, and said one and other areas being respectively subjected to atmosphere and the supplied fluid pressure to establish another holding force opposite to first named holding force and urging said application means toward its other position when said application means is in its other position.

15. A control valve comprising a housing having inlet, outlet, exhaust and control ports therein, selectively operable means movable in said housing between one and other positions including a pair of valve means for controlling pressure fluid communication between said inlet and outlet ports and between said outlet and exhaust ports, said valve means being movable from the one position establishing pressure fluid communication between said inlet and outlet ports and interrupting pressure fluid communication between said outlet and exhaust ports to the other position interrupting pressure fluid communication between said inlet and outlet ports and establishing pressure fluid communication between the outlet and exhaust ports in response to an applied force on said selectively operable means, resiliently urged means subjected to the fluid pressure at said control port and movable in said housing for driving and driven engagement with said selectively operable means in its one and other positions, said resiliently urged means being movable in response to fluid pressure less than a predetermined value at said control port acting thereon to drive said selectively operable means and valve means from the one position to the other position thereof, respectively, and passage means in said resiliently urged means between said outlet and exhaust ports for the venting passage therethrough of the established fluid pressure at said outlet port to said exhaust port when said selectively operable means and valve means are in the other position.

16. A control valve according to claim 15, comprising abutment means on said selectively operable means, and other abutment means on said resiliently urged means opposed to said first named abutment means for driving and driven engagement therewith in the one and other positions of said selectively operable means.

17. A control valve according to claim 15, wherein said selectively operable means extends coaxially through said passage means, a pair of opposed abutment means on said selectively operable means and on said resiliently urged means within said passage means, respectively, one of said abutment means being engaged with the other thereof upon the driving and driven engagement of said selectively operable means and resiliently urged means.

18. A control valve according to claim 17, comprising an effective area on said resiliently urged means subjected to the fluid pressure at said control port, said resiliently urged means being urged against its own force toward an inoperative position in said housing in response to the fluid pressure at said control port in excess of a predetermined value acting on said area and said resiliently urged means being movable in response to its own force toward an operative position in said housing to concertedly drive said selectively operable means therewith toward its other position when the fluid pressure at said control port acting on said area is less than the predetermined value.

19. A control valve according to claim 18, comprising opposed abutments in said housing for engagement with said resiliently urged means and defining the operative and inoperative positions thereof, respectively.

20. A control valve according to claim 18, wherein said resiliently urged means includes piston means slidable in said housing between said outlet and exhaust ports and having opposed end portions for respective engagement with said opposed abutments, said passage means extending substantially axially through said piston means and intersecting with said opposed end portions, and spring means engaged with said piston means and urging one of said one and other abutment means toward the other thereof, means on said piston means defining with said housing an expansible fluid pressure chamber connected in pressure fluid communication at all times with said control port, said area being on said piston means within said chamber, said piston means being movable against the force of said spring means in response to fluid pressure in excess of the predetermined value at said control port acting on said area toward its inoperative position engaging one of said opposed end portions with one of said abutments and said piston means being movable in response to the force of said spring means toward its operative position engaging the other of said opposed end portions with the other of said abutments and to drivingly engage the one of said one and other abutment means with the other thereof to concertedly drive said selectively operable means toward its other position when the fluid pressure at said control port acting on said area is less than the predetermined value.

21. A control valve according to claim 20, comprising a pair of valve seats in said housing between said inlet and outlet ports and between said outlet and exhaust ports, respectively, said selectively operable means including rod means slidable in said housing and extending coaxially through said passage means, and a pair of valve means on said rod means and concertedly movable therewith for respective engagement with said valve seat, one of said valve means being engaged with one of said valve seats to interrupt pressure fluid communication between said outlet and exhaust ports and the other of said valve means being disengaged from the other of said valve seats to establish pressure fluid communication between said inlet and outlet ports when said rod means is in its one position, and said one valve means being disengaged from said one valve seat to establish pressure fluid communication between said outlet and exhaust ports and said other valve seat being engaged with said other valve seat to interrupt pressure fluid communication between said inlet and outlet ports upon the movement of said rod means from its one position to the other position thereof.

22. A control valve comprising a housing having a pair of stepped counterbores therein, an end wall on said housing in the smaller of said stepped counterbores, hub means on said end wall and extending coaxially into the smaller of said stepped counterbores, a third counterbore in said housing coaxial with said stepped counterbores, a first bore in said housing extending through said hub means and connected between said third counterbore and the smaller of said stepped counterbores, a first shoulder on said housing between said stepped counterbores, an inlet port in said housing intersecting with said third counterbore, an outlet port in said housing intersecting with the smaller of said stepped counterbores adjacent to said end wall, said first bore having a sidewall defining a first valve seat between said inlet and outlet ports, a closure member in the larger of said stepped counterbores and retained therein against displacement, a first abutment on said closure member and opposing said end wall, an exhaust port in said closure member, a second bore in said closure member connected between said exhaust port and the larger of said stepped counterbores, said second bore having a sidewall defining a second valve seat between said outlet and exhaust ports, a stepped piston slidable in said stepped counterbores and having first and second opposed end portions thereon for engagement with said end wall and said first abutment, respectively, passage means in said stepped piston intersecting with said first and second opposed end portions thereof and connected in open pressure fluid communication between said outlet and exhaust ports, a second abutment on said stepped piston about said passage means, a spring within said passage means biased between said stepped piston and closure member urging said first end portion toward engagement with said end wall, said stepped piston defining with the larger of said stepped counterbores an expansible chamber in said housing, a second shoulder on said stepped piston opposed to said first shoulder and defining an effective area within said chamber, a control port in said housing intersecting with the larger of said stepped counterbores adjacent to said first shoulder and connected in pressure fluid communication with said chamber, said stepped piston being movable against the force of said spring toward an inoperative position in said housing engaging said second end portion with said first abutment in response to fluid pressure in excess of a predetermined value at said control port acting on said area, a selectively operable rod member movable in said housing between opposed one and other positions including opposed third and fourth end portions respectively slidable in said third counterbore and said second bore, said third end portion extending exteriorly of said housing for receiving an operating applied force thereon, a reduced intermediate portion connected between said third and fourth end portions and extending coaxially through said first bore and passage means, first valve means on said intermediate portion for engagement with said first valve seat, said first valve means being disengaged from said first valve seat to establish open pressure fluid communication between said inlet and outlet ports when said rod means is in its one position, second valve means on said fourth end portion for engagement with said second valve seat, said second valve means being engaged with said second valve seat to interrupt pressure fluid communication between said outlet and exhaust ports when said rod means is in its one position, and a third abutment on said rod means for engagement with said second abutment means, said stepped piston being movable from its inoperative position toward an operative position engaging said first end portion with said end wall in response to the force of said spring when the fluid pressure at said control port acting on said area is less than the predetermined value and said first abutment being engaged with said second abutment upon the movement of said stepped piston toward its operative position to concertedly drive said rod means toward its other position engaging said first valve means with said first valve seat to interrupt pressure fluid communication between said inlet and outlet ports and thereafter disengaging said second valve means from said second valve seat to establish open pressure fluid communication between said outlet and exhaust port through said piston passage means.

23. A control valve comprising a housing, selectively operable means movable in said housing between one and other positions and defining therewith spaced inlet and exhaust chambers, resiliently urged means movable in said housing and defining therewith an outlet chamber between said inlet and exhaust chambers for pressure fluid communication therewith and an expansible control fluid pressure chamber, abutment means on said resiliently urged means for driving engagement with said selectively operable means, and passage means in said resiliently urged means for communicating said outlet and exhaust chambers and substantially coaxial with said selectively operable means, said resiliently urged means being movable in response to its own force to drivingly engage said abutment means with said selectively operable means and concertedly move said selectively operable means from the one position to the other position thereof to isolate said inlet and outlet chambers and establish pressure fluid communication between said outlet and exhaust chambers through said passage means when the fluid pressure in said control chamber acting on said resiliently urged means is less than a predetermined value.

24. A fluid pressure system comprising a brake, a pair of fluid pressure sources, a spring setting fluid pressure released actuator responsive to fluid pressure applied thereto less than a predetermined value to effect spring setting energization of said brake, selectively operable means for effecting the application of fluid pressure in excess of the predetermined value from one of said sources to said actuator and for isolating said one source and venting said actuator to atmosphere, and other means responsive to fluid pressure at the other of said sources less than another predetermined value for automatically actuating said selectively operable means to isolate said one source and vent said actuator to atmosphere including means for the passage therethrough of the venting flow of the applied fluid pressure from said actuator to atmosphere.

25. A control valve comprising a housing, selectively operable means movable in said housing between one position effecting the application through said housing of fluid pressure supplied thereto and isolating the applied fluid pressure from atmosphere and another position isolating the supplied and applied fluid pressures and venting the applied fluid pressure to atmosphere, a free end portion on said selectively operable means, resiliently urged means movable in said housing between operative and inoperative positions and defining with said housing an expansible control fluid pressure chamber, said resiliently urged means being movable in response to its own force toward its operative position when control fluid pressure acting thereon in said chamber is less than a predetermined value, passage means in said resiliently urged means for the venting passage therethrough of the applied fluid pressure when said selectively operable means is in its other position, and abutment means on said resiliently urged means for engagement with said free end portion, said abutment means being drivingly engaged with said free end portion upon the movement of said resiliently urged means toward its operative position to concertedly move therewith said selectively operable means toward its other position.

26. A control valve comprising a housing having inlet, outlet and control ports therein, resiliently urged means movable in said housing and defining therewith an expansible chamber connected in pressure fluid communication with said control port, an exhaust port in said resiliently urged means, selectively operable means movable in said housing between opposed positions including a pair of valve means controlling pressure fluid communication between said inlet, outlet and exhaust ports, said valve means being movable toward positions in said housing respectively interrupting pressure fluid communication between said inlet and outlet ports and establishing pressure fluid communication between said outlet and exhaust ports upon the movement of said selectively operable means toward one of its opposed positions in response to an applied force thereon, a free end portion on said selectively operable means adjacent to one of said valve means, and abutment means on said resiliently urged means for engagement with said free end portion, said resiliently urged means being movable in response to its own force when the fluid pressure at said control port acting on said resiliently urged means is less than a predetermined value to drivingly engage said abutment means with said free end portion and urge said selectively operable means toward its one opposed position.

27. A control valve comprising a housing having a first bore therein connected between a pair of stepped counterbores and a third counterbore, inlet and control ports in said housing respectively intersecting with said third counterbore and the larger of said stepped counterbores, first and second annular shoulders on said housing between said first bore and the smaller of said stepped counterbores and between said stepped counterbores, respectively, a closure member connected with said housing adjacent to the open end of said larger stepped counterbore including a hub portion extending coaxially into said larger stepped counterbore, an interior end on said hub portion within said larger stepped counterbore, and a second bore in said closure member extending coaxially through said hub portion and intersecting with the interior end thereof, a control piston slidable in said second bore including radially extending flange means on one end thereof for engagement with said hub portion interior end, a blind bore in said control piston defining an end wall thereon, an exhaust port in said control piston intersecting with the end wall thereof, and first abutment means on said end wall extending into said blind bore, spring means engaged with said control piston and urging said flange means from engagement with said hub portion interior end toward engagement with said second shoulder, a sleeve member in said larger stepped counterbore having first and second opposed end portions, said first end portion being fixedly received in said smaller stepped counterbore and said second opposed end portion being slidably received in said control piston blind bore, a pair of stepped bores in said sleeve member respectively intersecting with said first and second opposed end portions thereof and connected between said first bore and said control piston blind bore, an outlet port in said housing, first passage means in said housing having one end connected with said outlet port and the other end thereof intersecting with said first shoulder and connecting with the larger of said stepped bores in said sleeve member, the side wall portions of said first bore and second sleeve member larger stepped bore defining first and second valve seats between said inlet and outlet ports and between said outlet and exhaust ports, respectively, an effective area on said control piston and subjected to the fluid pressure at said control port, said control piston being movable against the force of said spring means toward an inoperative position in said housing engaging said flange means with said closure member interior end in response to fluid pressure at said control port in excess of a predetermined value acting on said effective area, a selectively operable rod member movable in said housing between opposed one and other positions including opposed third and fourth end portions respectively slidable in said third counterbore and sleeve member smaller stepped bores, said third end portion extending exteriorly of said housing for receiving an applied force thereon, a reduced intermediate portion connected between said third and fourth end portions and extending coaxially through said first bore and said sleeve member smaller stepped bore, first valve means on said intermediate portion for engagement with said first valve seat, said first valve means being disengaged from said first valve seat to establish pressure fluid communication between said inlet and outlet ports when said rod means is in its one position, second valve means on said fourth end portion for engagement with said second valve means, said second valve means being engaged with said second valve seat to interrupt pressure fluid communication between said outlet and exhaust ports when said rod means is in its one position, second abutment means on said fourth end portion between said second valve means and said control piston exhaust port for engagement with said control piston first abutment means, said control piston being movable from its inoperative position toward an operative position in said housing engaging said flange means with said second shoulder in response to the force of said spring means when the fluid pressure at said control port acting on said area is less than the predetermined value and said first abutment means being drivingly engaged with said second abutment means upon the movement of said control piston toward its operative position to concertedly drive said rod means toward its other position engaging said first valve means with said first valve seat to interrupt pressure fluid communication between said inlet and outlet ports and thereafter disengaging said second valve means from said second valve seat to establish pressure fluid communication between said outlet and exhaust ports through said sleeve member stepped bores and said control piston blind bore.

* * * * *